Figure 1:
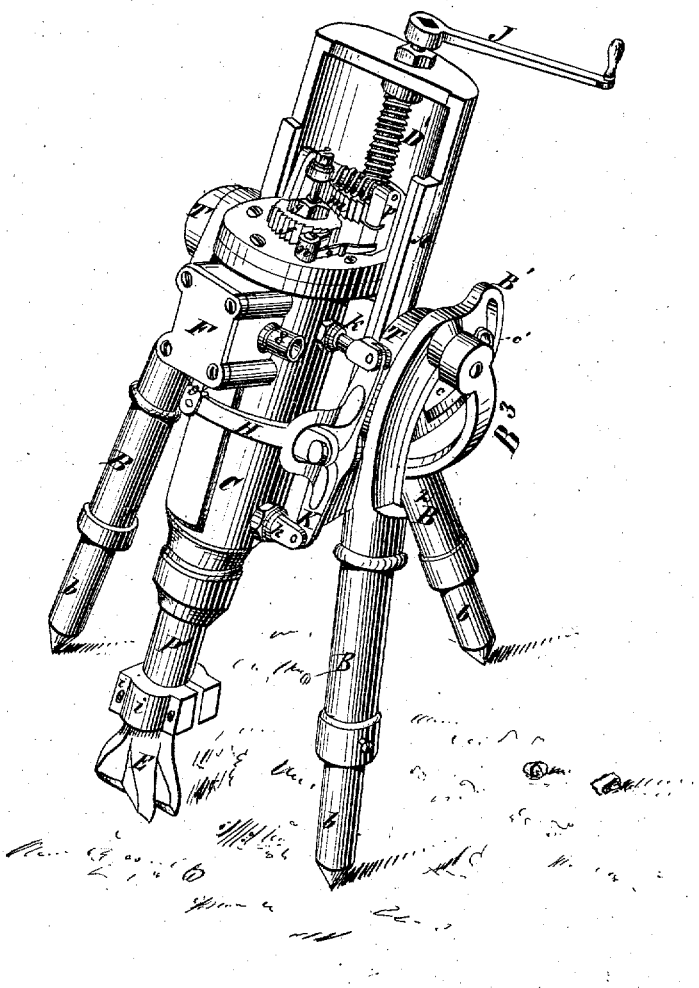

3 Sheets--Sheet 1.

S. INGERSOLL.

Machine for Drilling Rock.

No. 6,292. Reissued Feb. 16, 1875.

*Witnesses:*

P. Smith

Henry C. Sergeant

*Inventor.*

Simon Ingersoll

3 Sheets--Sheet 2.
S. INGERSOLL.
Machine for Drilling Rock.
No. 6,292.
Reissued Feb. 16, 1875.
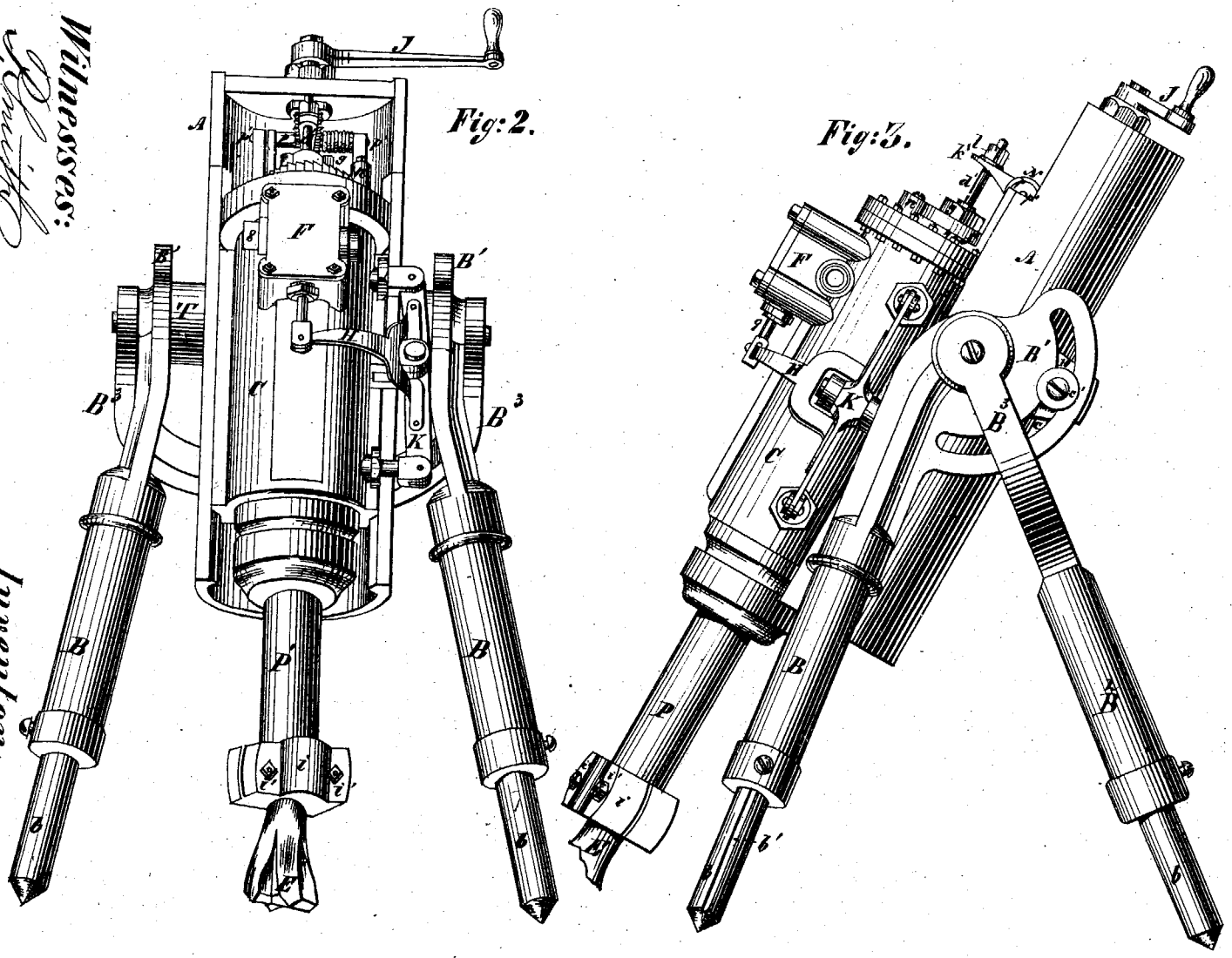
Wilnesses:
R. Smith
Henry C. Sergeant
Inventor:
Simon Ingersoll 3 Sheets--Sheet 3.
S. INGERSOLL.
Machine for Drilling Rock.
No. 6,292.
Reissued Feb. 16, 1875.
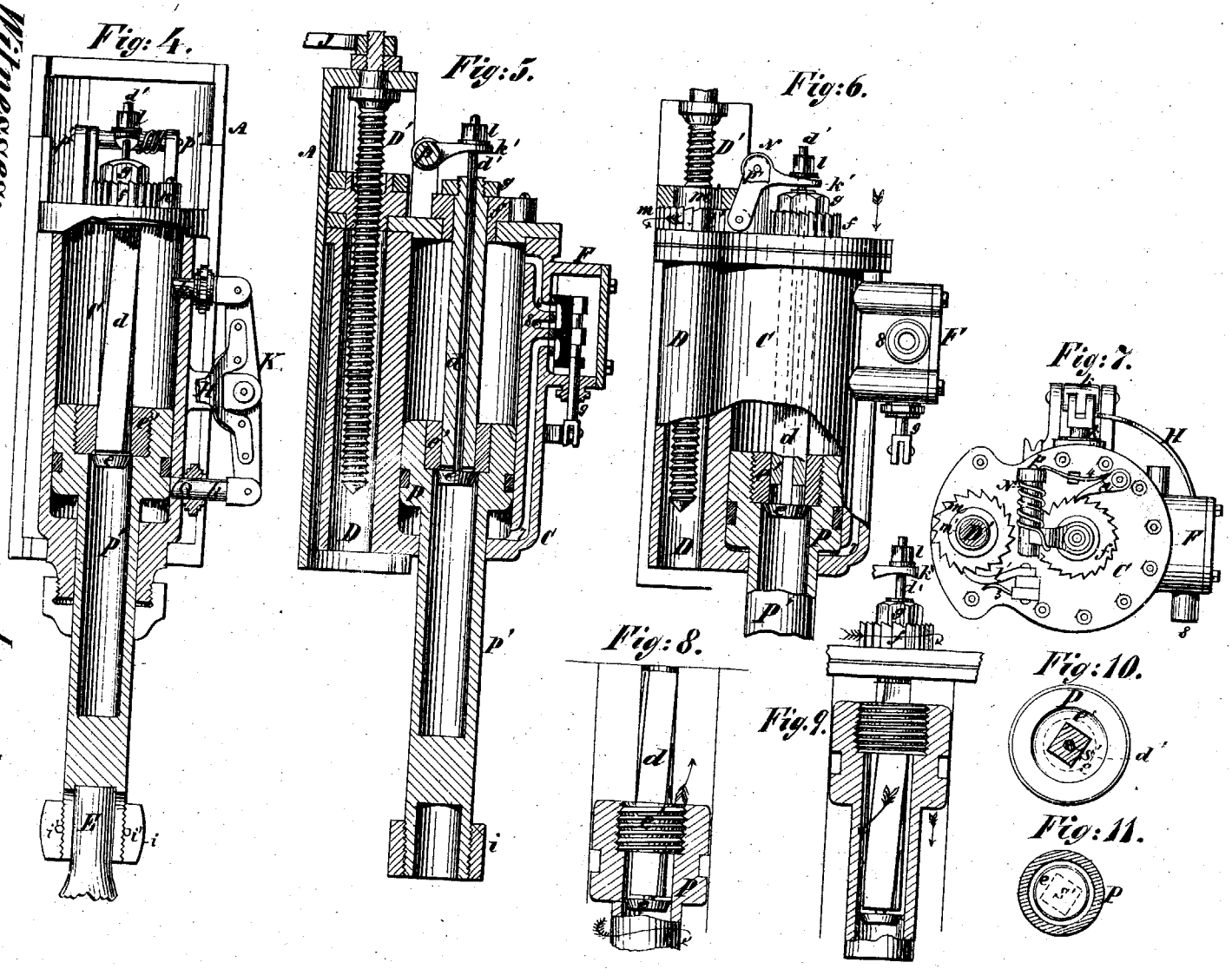
Witnesses:
P. Smith
Henry C. Sergeant
Inventor
Simon Ingersoll

UNITED STATES PATENT OFFICE.

SIMON INGERSOLL, OF BROOKLYN, N. Y., ASSIGNOR, BY MESNE ASSIGNMENTS, TO THE INGERSOLL ROCK-DRILL COMPANY, OF NEW YORK CITY.

IMPROVEMENT IN MACHINES FOR DRILLING ROCK.

Specification forming part of Letters Patent No. 112,254, dated February 28, 1871; reissue No. 6,292, dated February 16, 1875; application filed February 3, 1875.

*To all whom it may concern:*

Be it known that I, SIMON INGERSOLL, of the city of Brooklyn, county of Kings and State of New York, have invented certain new and useful Improvements in Machines for Drilling Rock; and that the following, taken in connection with the drawings, is a full, clear, and exact description thereof.

These improvements relate to the stand or contrivance upon which the drill-cylinder and its accessories are mounted, and to the apparatus by means of which the drilling-tool is fed at intervals, as required.

In the drawings, Figure 1 is a perspective view of the whole machine, including the supporting-stand. Figs. 2 and 3 are elevations of the same parts, taken at right angles each to the other. Figs. 4 and 5 are sections at right angles to each other through the axis of the cylinder. Fig. 6 is a view partly in section and partly in elevation. Fig. 7 is a plan of the cylinder-head and parts mounted thereon. Figs. 8, 9, 10, and 11 are representations of details.

The stand upon which the drill-cylinder and its accessories are mounted is a tripod of peculiar construction, which supports these parts firmly, and at the same time permits the axis of the cylinder to be inclined at various angles to the horizon, so that holes may be drilled vertically or horizontally, or at almost any required angle. This tripod consists of two legs, like ordinary tripod-legs, and of a third leg, which is forked at its upper extremity. The legs of the ordinary construction are shown at B B, the leg with the fork at $B^2$. If the tripod were of the ordinary construction, the drill-cylinder and its accessories would have to be mounted upon the tripod by means of an arm, at right angles to its axis, of some length, such arm being requisite in order that the cylinder could be tilted to drill holes at various angles. If the drill were so supported it would be difficult to hold it firmly; but when one of the legs is forked, as at $B^3$, space between the prongs of the fork is afforded for the reception of the cylinder and its accessories, and for the tilting of the drill and the drill-cylinder. The legs are attached to one another by bolts passing through the extremities of the prongs of the fork and the ends of the two ordinary legs, and the drill is supported by trunnions T, whose axes coincide with those of the bolts. Sectors $B^1$ are formed in one piece with the legs B. These sectors have a curved slot in them, through which projects a screw-bolt, $c'$, attached to arms 10, projecting from the trunnions. These screw-bolts are provided with clamp-nuts, and the drill, by these means, can be set or tilted and held at the desired angle.

In order to provide for inequalities of ground to a greater extent than can be attained by an ordinary tripod, and for the purpose also of varying the angle of the tool irrespective of the swiveling or tilting of the drill on its trunnions, I have made the legs adjustable in their length, forming them of hollow rods, into which solid rods *b* enter, these rods *b* being held in the desired position by set-screws. I call these adjustable legs telescopic legs. In order to prevent the legs from shortening too rapidly when the screws are slackened, and also to make the hold of the set-screws secure, I have formed in the rods *b* slots $b'$, which slots grow deeper as they extend upward. The weight of the drill, therefore, tends constantly to cause the ends of the screws to bind tighter, and when the screws are slackened the leg cannot shorten itself suddenly.

The drill is, like other drills, provided with a valve-motion, feed apparatus, and contrivances for turning it. The valve-motion shown in the drawings is of my own invention, but not claimed in this patent.

In the drawings, the drill-frame is shown at A, the cylinder at C, the piston-rod at $P'$, the piston at P, the valve-chest at F, the valve-stem at 9, and the valve-actuating mechanism at Q *k* H K. The piston and piston-rod are hollow, and in this cavity rests a button, *e*. This button is not a tight fit, and it is attached to a long stem, $d'$, which passes through a cavity formed in the center of the rod *d*. This rod is of square section, but the sides are twisted about one-eighth of a complete turn. The rod has attached to its upper end a ratchet-wheel, *f*, secured by a nut, *g*, and the whole construction is such that the rod can turn on its axis, but cannot move in the direction of its length, so that no great amount of steam can escape through the cylinder-head, and that the ratchet-wheel shall turn when the rod turns. The ratchet-wheel is provided with a spring-pawl, *n*, and the rod *d* fits loosely in a nut, *e'*, attached to the piston. The hole or orifice in this nut is of square section, but the orifice is twisted so as to correspond with the surface of the rod *d*.

The action of these parts is as follows: When the piston, piston-rod, and tool move forward or toward the rock, the twisted bar will be caused to revolve, carrying with it the ratchet wheel. (See upper arrow, Fig. 9.) When the piston moves backward, or toward the ratchet-wheel, the latter will be held at rest by its pawl, and the piston and tool will revolve as the former travels along the twisted bar, which is then held at rest. (See Fig. 8.) The stem of the button before referred to passes through the ratchet-wheel and its confining-nut, and has upon its end a nut, *l*. A rock-shaft arm, *k'*, projecting from a rock-shaft, *p*, having bearings at *p p'*, embraces the stem below the nut. This same rock-shaft has an arm projecting downward, (see Fig. 6,) to the lower end of which is attached, by a pivot, the pawl *l'*, (see specially Figs. 6 and 7,) which latter is kept, by a spring, 3, in contact with the teeth of a ratchet-wheel, *m*. This ratchet-wheel lies upon the cylinder-head, and is free to turn, but prevented from moving away from the cylinder-head by the cap *m'*. This wheel has a female screw cut in it, and through the nut thus formed the screw D' is passed. This screw lies in the sleeve D, and in the operation of the drill neither revolves nor moves forward, being secured to the frame A, which supports the cylinder, and upon which the cylinder can slide. A coiled spring, N, encircles the rock-shaft *p*, and is so arranged that it tends constantly to lift the arm *k'* up or away from the cylinder-head, and consequently to retract the pawl *l'*.

The operation of these parts is as follows: When the tool, piston-rod, and piston move so far toward the rock that the button *e* is struck by the nut *e'*, then the stem *d'* moves and turns the ratchet-nut *m* through the intervention of the rock-shaft, its arms, and the pawl. At the time that this occurs steam has been admitted upon that side of the piston nearest the tool, and the exhaust is opened upon the other side; consequently the cylinder tends to move downward, and would move downward or toward the rock if it were not held in place by the ratchet-nut and stationary screw. The turning of this nut permits the steam to force the cylinder down toward the rock, and it moves as far as the nut will permit it to go.

It thus appears that the stem and button and their accessories are not strictly feeding instruments, and do not do the work of feeding or causing the cylinder to approach the work, but simply act to permit the cylinder to be forced forward by the power of the steam. As the nut in the piston recedes from the button the coiled spring comes into play, lifts the stem, and draws the pawl back, so that it is ready again to act when the button is moved toward the tool.

It is evident that the button, stem, and piston will actuate any other feeding device as well as that which I have specially introduced into my drill.

I claim as of my own invention—

1. A tripod composed of two ordinary legs and one forked leg, substantially as described, whereon a drill may be mounted and tilted, as specified.

2. A tripod with telescopic legs having adjustable bearings at their upper ends, one of said legs being forked, substantially as specified, whereby greater facility is afforded in tilting a drill and supporting the same on uneven ground.

3. A tripod with telescopic legs, substantially such as are described, said legs having slots of varying depth formed in them in the manner and for the purpose specified.

4. A tripod composed of two ordinary legs and one forked leg, a slotted sector making part of each of the ordinary legs, as described, in combination with a drill-frame and its trunnions and clamp-screws, whereby the drill-frame can be held firmly tilted, if required, and held in any desired position when tilted, the combination being substantially such as specified.

5. A button and its stem arranged inside of the piston-rod, in combination with a screw and nut, whereby the cylinder is permitted to move forward, substantially in the manner and for the purposes specified.

SIMON INGERSOLL.

Witnesses:
P. SMITH,
HENRY C. SERGEANT.